Patented July 26, 1938

2,125,215

UNITED STATES PATENT OFFICE 2,125,215

PROCESS OF MAKING AN ALIMENTARY PRODUCT

Alexander D. Barbour, Toronto, Ontario, Canada, assignor to Ontario Research Foundation, Toronto, Ontario, Canada, a corporation of Ontario, Canada No Drawing. Application March 5, 1936, Serial No. 67,402

6 Claims. (Cl. 87—12)

This invention relates to the preparation of an edible and assimilable food product from vitamin-containing oils, such as cod liver oil, pilchard oil, halibut liver oil, etc., by hydrogenation.

The invention will be described in detail in connection with the production of an edible vitamin-containing product, i. e. a product free from objectionable odor and taste and of a suitable consistency or melting point from cod liver oil, but the invention embraces the use of other similar vitamin-containing oils, such as halibut liver oil, as starting material. The product is particularly adapted for use in foods, e. g. as shortening, and for incorporation into bread, milk, butter, etc., as a means of supplying the fat-soluble vitamins A and D to such food materials.

According to the present invention, cod liver oil or similar oil rich in vitamins is subjected to a controlled and limited hydrogenation under certain conditions to be more fully described hereinafter, including high pressure, a relatively low temperature, violent agitation, and the presence of a highly active hydrogenation catalyst. Under these conditions the cod liver oil may be hydrogenated without substantial loss of vitamin potency to a complete and permanent elimination of the objectionable fishy odor and taste of such oil. The product is stable and of a suitable consistency and chemical composition for use as or in medicinal and food products.

My hydrogenation process is carried out at a temperature below about 125° C. for a satisfactory conservation of the vitamin D content of the oil and preferably below about 85° C. for a satisfactory conservation of both vitamins A and D. This low hydrogenation temperature makes necessary the use of a highly active catalyst, the use of a fairly high pressure, and particularly a violent agitation of the mixture. In order to limit the cost of the process and of the resulting product so as to warrant its use in inexpensive foods such as bread and milk, I prefer to use a highly active nickel catalyst. A highly active nickel catalyst may be prepared by suspending powdered nickel formate in an oil or melted fat, such as cotton seed oil, and heating the mixture to about 260°–270° C. while passing a current of hydrogen gas through the mixture. A catalyst promoter such as aluminum, for example aluminum powder (so-called aluminum bronze) of 240 mesh, may be added to the mixture before the reduction and a filter aid, such as kieselguhr, may be added either before or after the reduction. The heating of the mixture is continued for from 10 to 30 minutes and the mixture is then cooled and filtered, the catalyst being recovered in the form of a solid or semi-solid cake containing the reduced nickel, the promoter, the filter aid and hardened or hydrogenated oil which is not separated by the filtration. The foregoing disclosure of the preparation of the catalyst is given in order to make clear what is meant by a highly active nickel catalyst, but it is not asserted that either the process or the resulting catalyst is novel. Highly active nickel catalyst prepared in other ways, or other catalysts of similar activity, may be employed.

The oil is mixed with a suitable quantity of the catalyst, for example a quantity amounting to about 0.5% of metallic nickel calculated on the weight of the oil, and the mixture is run into a tank provided with a suitable agitator and means for heating and for the introduction of hydrogen under pressure. Air is then thoroughly flushed out of the tank with hydrogen because any oxygen left in the tank will result in destruction of the vitamin content of the oil and the tank is then closed and the agitation is started, the oil is heated up to 75-85° C. and the hydrogen pressure increased to about 100 pounds per square inch or higher. The minimum operative hydrogen pressure has not been determined, but it has been found that a pressure of 100 pounds gives a suitable hydrogenation rate. In general the higher is the pressure and the more vigorous is the agitation the better will be the result. Violent agitation, i. e. agitation involving a splashing or spraying of the oil and the suspended catalyst into the hydrogen atmosphere in the vessel above the normal level of the oil has been found to be absolutely essential because without such agitation and with a highly active catalyst and at temperatures sufficiently low to avoid destruction of the vitamin content of the oil and regardless of the pressure employed no appreciable hydrogenation will take place within a reasonable length of time. The meaning of violent agitation may be further illustrated by the fact that for such agitation I have used a stirrer capable of revolving at the rate of 2,500 revolutions per minute.

The progress of the reaction is followed by withdrawing samples of the oil from the hydrogenation vessel at intervals for analysis. When the desired extent of hydrogenation has been reached the heating and agitation are stopped, the oil is withdrawn from the vessel and mixed with a filter aid to assist the removal of the catalyst, and filtered. The filtered product is ready for use.

As has been suggested above, other catalysts such as platinum and palladium are operative for effecting a hydrogenation of cod liver oil at low temperature, but such catalysts are so costly that they tend to render the process and product too expensive for use on a commercial scale. A feature of the present invention is the discovery of conditions, e. g. a combination of high pressure, low temperature and violent agitation, under which the cod liver oil can be hydrogenated to the desired extent without prohibitive destruction of the vitamin content of the oil, by the use of inexpensive highly active nickel catalyst.

It will be appreciated that cod liver oil and similar oils possess a fishy odor and flavor which render them objectionable to most people for use as or in foods and that they contain a substantial quantity of highly unsaturated fatty acid glycerides, e. g. glycerides containing three to five double bonds per molecule which have a tendency to absorb oxygen from the atmosphere and produce sticky or varnish-like and ill-smelling and tasting oxidation products. A complete hydrogenation of the oil to an iodine value approaching zero will of course saturate these double bonds and render the oil odorless, tasteless and stable, but such hydrogenation tends to destroy the vitamin content of the oil and increases its melting point to such an extent that the oil is not suitable for use as food. On the other hand a hydrogenation which is so limited that these highly unsaturated molecules are not eliminated, or even a treatment with hydrogen gas without hydrogenation, may result in rendering the oil temporarily odorless and tasteless, but the presence in the so treated oil of substantial amounts of highly unsaturated glycerides will leave the oil susceptible to oxidation with the attendant development of objectionable odor, taste, and gumminess. In accordance with the present invention, by a partial hydrogenation of the oil the original objectionable odor and taste are destroyed and the instability of the oil, i. e. its tendency on standing to develop objectionable odor, taste and gumminess, is destroyed. My explanation of these effects is that the highly unsaturated glycerides containing three or more unsaturated bonds are hydrogenated sufficiently that their tendency to absorb oxygen from the air and to polymerize, thereby developing odor, taste and gumminess, is destroyed. It is not to be understood that the highly unsaturated molecules are completely hydrogenated or saturated because the iodine number of the product indicates that it is still far from saturated, but it appears that the highly unsaturated molecules have at least been reduced to the point at which they no longer exhibit the tendency to oxidize and polymerize and develop objectionable odor and taste. The product has an iodine value of from about 70 to about 85 compared to an iodine value in the neighborhood of about 150–170 for cod liver oil before hydrogenation, and the melting point of the product is from about 35° C. to about 40° C. This relationship of iodine value to melting point may vary slightly with different oils, but in general oils which have been sufficiently hydrogenated to render them quite stable will have a melting point within the range from 30 to 45° C. Products having melting points above about 45° C. become increasingly difficult to assimilate as the melting point rises and are not suitable for use as food. Complete hydrogenation of cod liver oil may be regarded as corresponding to an iodine value of about 10 or less and to a melting point in the neighborhood of 60° C. The sufficiency of the hydrogenation to render the oil stable may be determined by treating the oil with bromine in ether solution. Sufficient hydrogenation is evidenced by the failure, under this treatment, to form insoluble bromides. This condition generally is attained at an iodine value of about 85 or less and is believed to correspond to the absence from the product of molecules containing 3 or more double bonds.

The product has an unobjectionable sweetish odor and taste. It contains a large proportion of the original vitamin A content of the oil and substantially all of the vitamin D. If cod liver oil of fairly high quality has been used the product will meet the minimum requirements of the U. S. Pharmacopoeia for medicinal cod liver oil i. e. not less than 600 international units of vitamin A and not less than 85 international units of vitamin D per gram.

In order to further emphasize the importance of the combination of low temperature, high hydrogen pressure, highly active nickel catalyst and violent agitation in my process, it is noted that it has been found that without violent agitation the pressure may be raised to 2,000 pounds per square inch for 100 hours without substantial hydrogenation of the oil. On the other hand violent agitation, presence of highly active nickel catalyst, and a temperature of 85° C. failed to give hydrogenation at atmospheric pressure. Furthermore the use of a non-active catalyst with the other specified conditions failed to give an acceptable hydrogenation of the oil and the use of high temperatures such as those customarily employed in the hydrogenation of oils, i. e. from 160° to 200° C. resulted in a rapid destruction of the vitamin activity of the oil.

I claim:

1. Process for the production of a partially hydrogenated vitamin-containing fish oil which has a melting point within the range from about 30° C. to about 45° C. and is free of objectionable odor and taste and tendency to form gummy products when exposed to the air which comprises hydrogenating a vitamin-containing fish oil under a hydrogen pressure materially above atmospheric pressure in the presence of a highly active nickel catalyst at a materially elevated temperature not exceeding about 125° C. while violently agitating the oil so as to shower or spray the same in contact with a body of hydrogen gas.

2. Process as defined in claim 1 in which the hydrogenation of the oil is carried to the point at which the iodine number of the oil has been reduced to about half of its original value.

3. Process as defined in claim 1 in which the hydrogenation is continued to the elimination of glycerides of highly unsaturated fatty acids containing more than two unsaturated double bonds but stopped short of complete saturation.

4. Process as defined in claim 1 in which the hydrogenation is carried out at a temperature of about 75° C. to 85° C.

5. Process as defined in claim 1 in which the hydrogenation is carried out under a hydrogen pressure of at least about 100 pounds per square inch.

6. Process as defined in claim 1 in which the oil is cod liver oil, the catalyst is a highly active nickel catalyst, and the hydrogenation is carried out at a temperature of about 75° C. to 85° C. at a pressure of at least about 100 pounds per square inch until the oil has a melting point within the range of from about 30° C. to about 45° C.

ALEXANDER D. BARBOUR.